US008470445B2

(12) United States Patent
Okafuji et al.

(10) Patent No.: US 8,470,445 B2
(45) Date of Patent: Jun. 25, 2013

(54) RESIN LAMINATE, METHOD FOR PRODUCTION THEREOF, AND TRANSFER FILM FOR USE IN THE PRODUCTION OF RESIN LAMINATE

(75) Inventors: Hiroshi Okafuji, Hiroshima (JP); Yukiko Tamura, Hiroshima (JP); Osamu Kawai, Hiroshima (JP); Kenichi Mori, Shiga (JP); Masayoshi Sato, Shiga (JP); Koji Itoh, Shiga (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 792 days.

(21) Appl. No.: 12/442,202

(22) PCT Filed: Sep. 18, 2007

(86) PCT No.: PCT/JP2007/068055
§ 371 (c)(1), (2), (4) Date: May 26, 2009

(87) PCT Pub. No.: WO2008/035660
PCT Pub. Date: Mar. 27, 2008

(65) Prior Publication Data
US 2010/0028693 A1 Feb. 4, 2010

(30) Foreign Application Priority Data
Sep. 20, 2006 (JP) ................................ 2006-254902

(51) Int. Cl.
*B32B 27/30* (2006.01)
*B32B 27/34* (2006.01)
*B32B 27/36* (2006.01)
*B32B 27/40* (2006.01)
*B32B 27/42* (2006.01)

(52) U.S. Cl.
USPC ......................... 428/424.2; 428/483; 428/515

(58) Field of Classification Search
USPC ....................................... 428/424.2, 483, 515
See application file for complete search history.

(56) References Cited

U.S. PATENT DOCUMENTS 5,391,472 A * 2/1995 Muys et al. .................. 430/527
6,440,654 B1 * 8/2002 Anderson et al. ............ 430/529

(Continued)

FOREIGN PATENT DOCUMENTS

JP 60 181177 9/1985
JP 64 56538 3/1989

(Continued)

OTHER PUBLICATIONS

Japanese Office Action issued May 15, 2012 in connection with Japanese Patent Application No. 2007-548630.

*Primary Examiner* — Thao T. Tran
(74) *Attorney, Agent, or Firm* — Oblon, Spivak, McClelland, Maier & Neustadt, L.L.P.

(57) ABSTRACT

Disclosed is a resin laminate having a surface layer excellent in antistatic properties, scratch resistance, and transparency. Also disclosed is a method for producing the resin laminate with a high productivity. Further disclosed is a transfer film for use in the production of the resin laminate. The resin laminate comprises a resin shaped article, an antistatic layer containing a π-electron conjugated conductive polymer and at least one resin selected from a polyester resin, a polyurethane resin, a polyesterurethane resin, an acrylic resin, and a melamine resin on at least one surface of the shaped article, and a cured coating film layer obtained by curing a curable resin on the antistatic layer. The method for producing the resin laminate preferably comprises the steps of forming the cured coating film layer and the antistatic layer on a mold using a transfer film, carrying out cast polymerization of a raw material for a resin, and detaching the resin laminate from the mold after the polymerization is completed.

11 Claims, 1 Drawing Sheet

U.S. PATENT DOCUMENTS

| | | | | |
|---|---|---|---|---|
| 6,582,789 | B1 * | 6/2003 | Sumi | 428/40.1 |
| 7,393,472 | B2 * | 7/2008 | Lee et al. | 252/500 |
| 8,187,699 | B2 * | 5/2012 | Iwata et al. | 428/220 |

FOREIGN PATENT DOCUMENTS

| | | |
|---|---|---|
| JP | 10 278160 | 10/1998 |
| JP | 11 300903 | 11/1999 |
| JP | 2001-1691 | 1/2001 |
| JP | 2002 298648 | 10/2002 |
| JP | 2003 165178 | 6/2003 |
| JP | 2003 326538 | 11/2003 |
| JP | 2004 175578 | 6/2004 |

* cited by examiner

RESIN LAMINATE, METHOD FOR PRODUCTION THEREOF, AND TRANSFER FILM FOR USE IN THE PRODUCTION OF RESIN LAMINATE

TECHNICAL FIELD

The present invention relates to a resin laminate having a shape such as plate, suitable for uses such as front plates of displays, and excellent in transparency, antistatic properties, and scratch resistance; a method for production of the resin laminate; and a transfer film to be used for the production of the resin laminate.

BACKGROUND ART

Transparent resins such as acrylic resins are widely used as industrial materials, construction materials, and the like. Particularly in recent years, acrylic resins have been used as front plates of various displays such as CRT and a liquid crystal television from viewpoints of transparency and impact resistance. However, acrylic resins are liable to be marred by scratching because they are tender as well as the other resins as compared with glass. In addition, transparency of acrylic resins is liable to be deteriorated because acrylic resins have high surface intrinsic resistance and hence dust adheres to the surface of acrylic resins owing to static electricity.

As a method to improve scratch resistance, a method is known in which a crosslinked resin layer is formed on the surface of a resin shaped article using a polyfunctional monomer such as polyfunctional (meth)acrylate. However, conventional crosslinked resin layers do not show antistatic properties at all or tend not to show satisfactory antistatic properties.

Accordingly, a method to give antistatic properties as well as scratch resistance is proposed. For example, a method to laminate a coating film layer containing a conductive powder based on tin oxide is disclosed as referred to in Patent Document 1. However, when film thickness is increased till excellent scratch resistance is provided in the case of an antistatic layer containing a conductive powder such as tin oxide, there is a case where coloring occurs attributed to the conductive powder.

In addition, a method to shape an article after embedding a thin-film antistatic layer between the crosslinked resins layer and the resin shaped article is proposed as a method to satisfy both scratch resistance and antistatic properties. For example, a method to laminate a layer on an antistatic layer containing antimony oxide fine particles is disclosed as referred to in Patent Document 2. However, when an antistatic layer containing a conductive powder such as antimony oxide is laminated, there is a problem such that a rainbow pattern or cloudiness is observed and hence a surface appearance becomes insufficient. In addition, there has been a problem such that productivity is low because the antistatic layer containing a conductive powder cannot be formed continuously.

On the other hand, a method is known in which a resin shaped article having a surface layer excellent in scratch resistance as well as antistatic properties is produced in a high productivity. For example, a method for producing a resin shaped article by film transfer is disclosed as referred to in Patent Document 3. However, as for the film provided by this method, transparency is easily deteriorated, and further improvement is desired.

Patent Document 1: Japanese Patent Application Laid-Open No. Sho 60-181,177

Patent Document 2: Japanese Patent Application Laid-Open No. Sho 64-56,538

Patent Document 3: Japanese Patent Application Laid-Open No. 2003-326,538

DISCLOSURE OF THE INVENTION

Problem to be Solved by the Invention

It is an object of the present invention to provide a resin laminate having a surface layer excellent in antistatic properties, scratch resistance, and transparency. It is another object of the present invention to provide a method to produce the resin laminate in a high productivity. It is further object of the present invention to provide a transfer film to be used in the production of the resin laminate.

Means to Solve the Problem

The present invention relates to a resin laminate having a cured coating film layer obtained by curing a curable resin on an antistatic layer which contains a π-electron conjugated conductive polymer and at least one resin selected from a polyester resin, a polyurethane resin, a polyesterurethane resin, an acrylic resin, and a melamine resin and resides on at least one surface of a resin shaped article.

Further, it is a preferable embodiment in the present invention pertaining to the resin shaped article that the resin shaped article is an acrylic resin shaped article, or that the π-electron conjugated conductive polymer contains a unit of thiophene or its derivative as a constitutional unit.

Further, the present invention relates to a method for production of a resin laminate, comprising:

the first step of applying a transfer film to a mold by causing a coating layer made of a paint containing a curable resin to lie between the transfer film and the mold, with an antistatic layer of the transfer film being at a side of the mold, the transfer film having the antistatic layer containing a π-electron conjugated conductive polymer and at least one resin selected from a polyester resin, a polyurethane resin, a polyesterurethane resin, an acrylic resin, and a melamine resin on at least one surface of a transparent base film;

the second step of forming a cured coating film layer by curing the curable resin in the coating layer;

the third step of peeling the transparent base film off the mold leaving behind the cured coating film layer laminated on the mold and the antistatic layer laminated on the cured coating film layer;

the fourth step of making a template using the mold having the cured coating film layer and the antistatic layer laminated on the cured coating film layer;

the fifth step of carrying out cast polymerization after pouring of a raw material for a resin into the template; and the sixth step of detaching a resin laminate having the cured coating film layer and the antistatic layer sequentially laminated on a resin shaped article thus formed by the polymerization from the template after the polymerization has been completed.

Further, it is a preferable embodiment of the method for production of a resin laminate that the method comprises:

the first step of applying a transfer film to a mold by causing a coating layer made of a paint containing an ultraviolet curable resin as a curable resin to lie between the transfer film and the mold, with an antistatic layer of the transfer film being at a side of the mold, the transfer film having the antistatic layer containing a π-electron conjugated conductive polymer and at least one resin selected from a polyester resin, a polyurethane resin, a polyesterurethane resin, an acrylic resin, and a melamine resin on at least one surface of a transparent base film;

the second step of forming a cured coating film layer by curing the ultraviolet curable resin in the coating layer by means of irradiating ultraviolet light on the ultraviolet curable resin through the transfer film;

third step of peeling the transparent base film off the mold leaving behind the cured coating film layer laminated on the mold and the antistatic layer laminated on the cured coating film layer;

the fourth step of making a template using the mold having the cured coating film layer and the antistatic layer laminated on the cured coating film layer;

the fifth step of carrying out cast polymerization after pouring of a raw material for a resin into the template; and the sixth step of detaching a resin laminate having the cured coating film layer and the antistatic layer sequentially laminated on a resin shaped article thus formed by the polymerization from the template after the polymerization has been completed.

Further, it is a preferable embodiment of the method for production of a resin laminate that the temperature of the paint containing the curable resin is controlled to fall in the range of from 30 to 100° C. in the first step when the transfer film is applied to the mold by causing the coating layer made of the paint containing the curable resin to lie between the transfer film and the mold, with the antistatic layer of the transfer film being at the side of the mold.

Further, the present invention relates to a transfer film for use in the production of a resin laminate to be made by laminating an antistatic layer and a cured coating film layer on a resin shaped article, the transfer film having the antistatic layer which contains a π-electron conjugated conductive polymer and at least one resin selected from a polyester resin, a polyurethane resin, a polyesterurethane resin, an acrylic resin, and a melamine resin and resides on at least one surface of a transparent base film, wherein surface resistance as measured at a side of the antistatic layer falls in the range of from $1\times10^5$ to $1\times10^{12}$ Ω/□.

Further, it is a preferable embodiment in the present invention pertaining to the transfer film for use in the production of the resin laminate mentioned above that the π-electron conjugated conductive polymer contains a unit of thiophene or its derivative as a constitutional unit or that a mold release layer, an intermediate layer, and the antistatic layer is laminated in this order on the transparent base film, and the intermediate layer is constituted of an acrylic resin.

EFFECT OF THE INVENTION

According to the present invention, the resin laminate excellent in scratch resistance and transparency as well as being capable of showing sufficient antistatic properties and also excellent in appearance without observation of any Moire patterns can be obtained because, in the resin laminate of the present invention, an antistatic layer containing a π-electron conjugated conductive polymer and at least one resin selected from a polyester resin, a polyurethane resin, a polyesterurethane resin, an acrylic resin, and a melamine resin is provided on at least one surface of a resin shaped article, and further, a cured coating film layer obtained by curing a curable resin on the antistatic layer is laminated on the antistatic layer.

In addition, according to the present invention, the resin laminate having an excellent surface free of defects such as those caused by foreign substances can be obtained because the surface is formed by transferring a mold surface, and the resin laminate can be produced in a high productivity.

Figure 1:
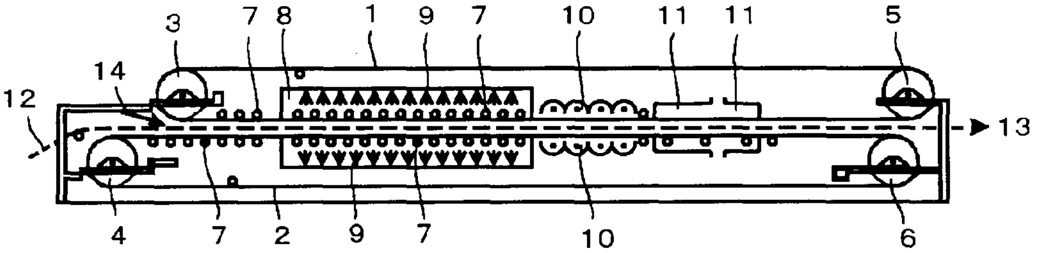
FIG. 1: A schematic sectional view illustrating a belt type continuous cast plate manufacturing device usable for the method of the present invention.

| EXPLANATION OF NUMERALS | |
|---|---|
| 1, 2: | Endless belts |
| 3, 4, 5, 6: | Main pulley |
| 7: | Carrier roll |
| 8: | The first polymerization zone |
| 9: | Hot water spray |
| 10: | The second polymerization zone |
| 11: | Cooling zone |
| 12: | Gasket |
| 13: | Taking-out direction of a resin laminate |
| 14: | Pouring device for a polymerizable raw material |
| 15: | Transfer film |
| 16: | Paint containing an ultraviolet curable resin |
| 17: | Rubber roll |
| 18: | Fluorescent ultraviolet lamp |
| 19: | High-pressure mercury-vapor lamp |
| 20: | Laminated functional layer |

BEST MODE FOR CARRYING OUT THE INVENTION

The resin laminate of the present invention has an antistatic layer on at least one surface of a resin shaped article and further, a cured coating film layer on the antistatic layer.

The cured coating film layer is the one in which a curable resin composed of various curable compounds that realize scratch resistance is cured in a film-like shape. As the curable resin, the one of a radical polymerization type such as ultraviolet curable resin to be described below, and the one composed of a thermally polymerizable curable compound such as alkoxysilane or alkyl alkoxysilane can be recited. These curable compounds are, for example, cured by irradiating an energy line such as electron beam, radioactive ray or ultraviolet light, or cured by heating. These curable compounds may be used alone or in a combination of two or more kinds.

In the resin laminate of the present invention, it is preferable to use an ultraviolet curable resin as the curable resin constituting the cured coating film layer. Hereinafter, the resin laminate having the cured coating film layer obtained by curing the ultraviolet curable resin will be explained.

As the ultraviolet curable resin, it is preferable to use the ultraviolet curable resin obtained from a compound having at least two (meth)acryloyloxy groups in a molecule and a photoinitiator from the viewpoint of productivity.

For example, as a main compound having at least two (meth)acryloyloxy groups in a molecule, an ester obtained from 1 mole of a polyol and at least 2 moles of (meth)acrylic acid or its derivative; and an ester obtained from a polyol, a polyvalent carboxylic acid or its anhydride, and (meth)acrylic acid or its derivative can be mentioned.

Further, as specific examples of an ester obtained from 1 mole of a polyol and at least 2 moles of (meth)acrylic acid or its derivative, di(meth)acrylate of polyethylene glycols such as diethylene glycol di(meth)acrylate, triethylene glycol di(meth)acrylate, and tetraethylene glycol di(meth)acrylate; di(meth)acrylate of alkyl diols such as 1,4-butanediol di(meth)acrylate, 1,6-hexanediol di(meth)acrylate, and 1,9-nonanediol di(meth)acrylate; poly(meth)acrylate of polyols having at least three functional groups such as trimethylolpropane tri(meth)acrylate, trimethylolethane tri(meth)acrylate, penta glycerol tri(meth)acrylate, pentaerythritol tri (meth)acrylate, pentaerythritol tetra(meth)acrylate, glycerin tri(meth)acrylate, dipentaerythritol tri(meth)acrylate, dipentaerythritol tetra(meth)acrylate, dipentaerythritol penta (meth)acrylate, dipentaerythritol hexa(meth)acrylate, tripentaerythritol tetra(meth)acrylate, tripentaerythritol penta (meth)acrylate, tripentaerythritol hexa(meth)acrylate, and tripentaerythritol hepta(meth)acrylate can be mentioned.

Further, as examples of a preferable combination (a polyvalent carboxylic acid or its anhydride/a polyol/(meth)acrylic acid or its derivative) of a polyol, a polyvalent carboxylic acid or its anhydride, and (meth)acrylic acid or its derivative in an ester obtained from a polyol, a polyvalent carboxylic acid or its anhydride, and (meth)acrylic acid or its derivative, malonic acid/trimethylolethane/(meth)acrylic acid, malonic acid/trimethylolpropane/(meth)acrylic acid, malonic acid/glycerin/(meth)acrylic acid, malonic acid/pentaerythritol/(meth)acrylic acid, succinic acid/trimethylolethane/(meth) acrylic acid, succinic acid/trimethylolpropane/(meth)acrylic acid, succinic acid/glycerin/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/glycerin/(meth)acrylic acid, adipic acid/pentaerythritol/(meth)acrylic acid, glutaric acid/trimethylolethane/(meth)acrylic acid, glutaric acid/trimethylolpropane/(meth)acrylic acid, glutaric acid/glycerin/(meth) acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerin/(meth)acrylic acid, sebacic acid/pentaerythritol/(meth)acrylic acid, fumaric acid/trimethylolethane/(meth) acrylic acid, fumaric acid/trimethylolpropane/(meth)acrylic acid, fumaric acid/glycerin/(meth)acrylic acid, fumaric acid/pentaerythritol/(meth)acrylic acid, itaconic acid/trimethylolethane/(meth)acrylic acid, itaconic acid/trimethylolpropane/(meth)acrylic acid, itaconic acid/glycerin/(meth)acrylic acid, itaconic acid/pentaerythritol/(meth)acrylic acid, maleic anhydride/trimethylolethane/(meth)acrylic acid, maleic anhydride/trimethylolpropane/(meth)acrylic acid, maleic anhydride/glycerin/(meth)acrylic acid, and maleic anhydride/pentaerythritol/(meth)acrylic acid can be mentioned.

As other examples of a compound having at least two (meth)acryloyloxy groups in a molecule, an urethane (meth) acrylate obtained by reacting 1 mole of a polyisocyanate obtained by trimerization of diisocyanate such as trimethylolpropane toluylenediisocyanate, hexamethylene diisocyanate, tolylene diisocyanate, diphenylmethane diisocyanate, xylene diisocyanate, 4,4'-methylenebis(cyclohexylisocyanate), isophorone diisocyanate, and trimethyl hexamethylene diisocyanate with at least 3 moles of an acrylic monomer having active hydrogen such as 2-hydroxyethyl (meth)acrylate, 2-hydroxypropyl (meth)acrylate, 2-hydroxy-3-methoxypropyl (meth)acrylate, N-methylol (meth)acrylamide, N-hydroxy (meth)acrylamide, 1,2,3-propane triols-1,3-di (meth)acrylate, and 3-acryloyloxy-2-hydroxypropyl (meth) acrylate; a poly[(meth)acryloyloxyethylene]isocyanurate such as di(meth)acrylate or tri(meth)acrylate of tris(2-hydroxyethyl) isocyanuric acid; epoxy poly(meth)acrylate; and urethane poly(meth)acrylate can be mentioned. Here, "(meth)acryl" means "methacryl" or "acryl".

As a photoinitiator, for example, carbonyl compounds such as benzoin, benzoin methyl ether, benzoin ethyl ether, benzoin iso-propyl ether, benzoin isobutyl ether, acetoin, butyloin, toluoin, benzyl, benzophenone, p-methoxy benzophenone, 2,2-diethoxy acetophenone, α,α-dimethoxy-α-phenylacetophenone, methylphenyl glyoxylate, ethylphenyl glyoxylate, 4,4'-bis(dimethylamino)benzophenone, and 2-hydroxy-2-methyl-1-phenylpropane-1-on; sulfur compounds such as tetramethylthiuram monosulphide and tetramethylthiuram disulfide; and phosphorus compounds such as 2,4,6-trimethylbenzoyl diphenylphosphine oxide and benzoyl diethoxyphosphine oxide can be mentioned.

The amount of addition of a photoinitiator is preferably 0.1% by mass or more based on the whole constituents of the cured coating film layer including the ultraviolet curable resin from the viewpoint of hardenability by ultraviolet irradiation, and 10% by mass or less from the viewpoint of maintaining good color tone of the cured coating film layer.

Various components such as a monomer having one functional group in a molecule, a leveling agent, conductive inorganic fine particles, non-conductive inorganic fine particles, an ultraviolet absorbent, and a photostabilizer can be further added to the paint for the cured coating film layer formation including the curable resin, if necessary. The amount of addition thereof is preferably 10% by mass or less from the viewpoint of transparency of the resin laminate.

The thickness of the cured coating film layer is preferably from 1 to 100 μm. In such a range, sufficient surface hardness is provided and antistatic properties also become excellent. The thickness is more preferably from 1 to 30 μm.

As the resin shaped article, for example, a sheet shaped article constituted of polymethyl methacrylate, a copolymer having methyl methacrylate units as a main component, polystyrene, styrene-methyl methacrylate copolymer, styrene-acrylonitrile copolymer, polycarbonate, polyvinyl chloride resin, or polyester resin can be mentioned. A shaped article constituted of an acrylic resin such as polymethyl methacrylate, the copolymer having methyl methacrylate units as a main component, or styrene-methyl methacrylate copolymer is preferable from the viewpoint of transparency and weather resistance. In addition, an ultraviolet absorbent, photostabilizer, antioxidant, impact modifier, flame retardant, coloring agent or light diffusion agent may be added to the resin shaped article, if necessary. The thickness of the resin laminate is usually about 0.1 to 10 mm. The thickness of the resin laminate is preferably 0.3 mm or more and more preferably 0.5 mm or more from the viewpoint of protecting displays from physical impact from outside, in consideration of uses such as front plates of the displays, or from the viewpoint of easiness of handling in processing such as production or cutting of the resin laminate.

The antistatic layer to be used in the present invention is constituted of a layer containing a π-electron conjugated conductive polymer and at least one resin selected from polyester resin, polyurethane resin, polyesterurethane resin, acrylic resin, and melamine resin.

As the π-electron conjugated conductive polymer, it is preferable to contain a unit of aniline or its derivative, pyrrole or its derivative, isothianaphthene or its derivative, acetylene or its derivative, or thiophene or its derivative as a constitutional unit. Among them, it is preferable to contain a unit of thiophene or its derivative as a constitutional unit from the viewpoint of exhibiting little coloring. The π-electron conjugated conductive polymer may be a homopolymer containing one kind of constitutional units as repeating units or a copolymer containing two or more kinds of constitutional units as repeating units.

As the conductive polymer containing a unit of thiophene or its derivative as a constitutional unit, ones on the market can be suitably used. For example, Baytron P series (trade name) manufactured by H.C. Starck Ltd., Denatron P-502RG and P-502S, manufactured by Nagase ChemteX Corporation, CONISOL F202, F205, F210 and P810 (all trade names) manufactured by InsCon Tech Co., Ltd., and CPS-AS-X03 (trade name) manufactured by Shin-Etsu Polymer Co., Ltd. can be mentioned.

The compounding amount of the π-electron conjugated conductive polymer to be contained in the antistatic layer is preferably from 10 to 90% by mass in the antistatic layer and more preferably from 10 to 70% by mass from the viewpoint of nicely realizing antistatic properties of the resin laminate.

It is preferable to incorporate another resin component into the antistatic layer besides the π-electron conjugated conductive polymer for improvement of adhesion properties of the antistatic layer with the cured coating film layer and for improvement of strength of coating film of the antistatic layer. As the other resin component, a polyester resin, polyurethane resin, polyesterurethane resin, acrylic resin, and melamine resin can be mentioned, however, the polyester resin, acrylic resin, polyurethane resin and polyesterurethane resin are preferable from the viewpoints of adhesion properties of the antistatic layer with the cured coating film layer and compatibility with the conductive polymer. The polyester resin is more preferable from the viewpoints of transparency, adhesion properties of the antistatic layer with the cured coating film layer, and flexibility.

The polyester resin is obtained by polymerizing (1) a polybasic acid or its ester-forming derivative with (2) a polyol or its ester-forming derivative, and a copolymer to be obtained using two or more kinds of the (1) or (2) is suitable.

As the polybasic acid component, for example, terephthalic acid, isophthalic acid, phthalic acid, phthalic anhydride, 2,6-naphthalene dicarboxylic acid, 1,4-cyclohexane dicarboxylic acid, adipic acid, sebacic acid, trimellitic acid, pyromellitic acid, a dimer acid, and 5-sodium sulfoisophthalic acid can be mentioned. In addition, some quantity of an unsaturated polybasic acid component such as maleic acid and itaconic acid and a hydroxy carboxylic acid like p-hydroxybenzoic acid can be used.

As the polyol component, for example, ethylene glycol, 1,4-butanediol, diethylene glycol, dipropylene glycol, 1,6-hexanediol, 1,4-cyclohexane dimethanol, xylene glycol, dimethylol propane, poly(ethylene oxide) glycol, and poly(tetramethylene oxide) glycol can be mentioned.

The acrylic resin is obtained by polymerizing an acrylic monomer which will be shown below. In addition, two or more kinds of the monomers shown below may be copolymerized to obtain the acrylic resin:

(a) an alkyl acrylate and alkyl methacrylate (an alkyl group being methyl group, ethyl group, n-propyl group, isopropyl group, n-butyl group, isobutyl group, t-butyl group, 2-ethylhexyl group, cyclohexyl group, and the like);

(b) a hydroxy group-containing monomer such as 2-hydroxyethyl acrylate, 2-hydroxyethyl methacrylate, 2-hydroxypropyl acrylate, or 2-hydroxypropyl methacrylate;

(c) an epoxy group-containing monomer such as glycidyl acrylate, glycidyl methacrylate, or allyl glycidyl ether;

(d) a monomer containing a carboxyl group or its salt such as acrylic acid, methacrylic acid, itaconic acid, maleic acid, fumaric acid, crotonic acid, or styrenesulfonic acid or its salt (sodium salt, potassium salt, ammonium salt, tertiary amine salt, or the like);

(e) a monomer containing an amide group such as acrylamide, methacrylamide, N-alkyl acrylamide, N-alkyl methacrylamide, N,N-dialkyl acrylamide, N,N-dialkyl methacrylamide (an alkyl group being methyl group, ethyl group, n-propyl group, isopropyl group, n-butyl group, isobutyl group, t-butyl group, 2-ethylhexyl group, cyclohexyl group, and the like), N-alkoxy acrylamide, N-alkoxy methacrylamide, N, N-dialkoxy acrylamide, N,N-dialkoxy methacrylamide (an alkoxy group being methoxy group, ethoxy group, butoxy group, isobutoxy group, and the like), acryloyl morpholine, N-methylolacrylamide, N-methylol methacrylamide, N-phenyl acrylamide, or N-phenyl methacrylamide;

(f) an acid anhydride monomer such as maleic anhydride or itaconic acid anhydride; and (g) a monomer such as acryloyl morpholine, vinyl isocyanate, allyl isocyanate, styrene, α-methylstyrene, vinyl methyl ether, vinyl ethyl ether, vinyl trialkoxysilane, alkyl maleic acid monoester, alkyl fumaric acid monoester, alkyl itaconic acid monoester, acrylonitrile, methacrylonitrile, vinylidene chloride, ethylene, propylene, vinyl chloride, vinyl acetate, or butadiene.

The polyurethane resin can be obtained by reacting a polyol, polyisocyanate, chain length regulator, crosslinking agent, and the like.

As examples of the polyol, polyethers such as polyoxyethylene glycol, polyoxypropylene glycol, and polyoxy tetramethylene glycol; polyesters to be obtained by dehydration reaction between a dicarboxylic acid and a glycol, which include polyethylene adipate, polyethylene-butylene adipate, and polycaprolactone; polycarbonates having a carbonate bond; acrylic polyols; and castor oil can be mentioned.

As examples of the polyisocyanate, tolylene diisocyanate, phenylene diisocyanate, 4,4'-diphenylmethane diisocyanate, hexamethylene diisocyanate, xylylene diisocyanate, 4,4'-dicyclohexylmethane diisocyanate, and isophorone diisocyanate can be mentioned.

As examples of the chain length regulator or the crosslinking agent, ethylene glycol, propylene glycol, diethylene glycol, trimethylolpropane, hydrazine, ethylenediamine, diethylenetriamine, triethylenetetramine, 4,4'-diaminodiphenyl methane, 4,4'-diaminodicyclohexyl methane, and water can be mentioned.

In addition, a modified body of each of the polyester resin, acrylic resin, and polyurethane resin can be used, too. For example, an acrylic-modified polyester resin, urethane-modified polyester resin, polyester-modified acrylic resin, urethane-modified acrylic resin, polyester-modified urethane resin, and acrylic-modified urethane resin can be mentioned. In addition, a copolymer obtained by introducing an acid anhydride having a double bond into a principal main main chain of its constituent monomer followed by grafting a compound having a carboxyl group to the acid anhydride may be used.

The polyester urethane resin means the polyester-modified urethane resin or the urethane-modified polyester resin.

It is preferable for the polyester resin, acrylic resin, and polyurethane resin to have water solubility and water dispersibility from the viewpoint of environmental pollution or explosion-proof. In addition, an organic solvent may be contained within the range that is not beyond the subject matter of the present invention as an aid for the water-soluble or water-dispersible resin.

To give hydrophilic property to the polyester resin, acrylic resin, and polyurethane resin, it is preferable to introduce a hydrophilic group such as hydroxy group, carboxyl group, sulfonic group, sulphonyl group, phosphate group, or other group into each molecular chain of these resins. Among the hydrophilic groups, a carboxylic group or sulfonic group is preferable from the viewpoints of physical properties of coating films and adhesion properties.

Further, when the hydrophilic group is introduced into the polyurethane resin, it is preferable to use a compound having two or more active hydrogen groups, each of which has a hydrophilic group and reacts with an isocyanate group, such as hydroxy group, amino group, thiol group, and carboxyl group.

The compounding amount of the other resin component to be contained in the antistatic layer is preferably from 10 to 90% by mass in the antistatic layer and more preferably from 30 to 90% by mass from the viewpoint of nicely realizing antistatic properties of the resin laminate.

It is preferable to incorporate a surfactant into the antistatic layer for improvement of adhesion properties between the antistatic layer and the cured coating film layer. The compounding amount of the surfactant to be contained in the antistatic layer is preferably from 0.1 to 10% by mass from the viewpoints of appearance and adhesion properties of the antistatic layer. When the content of the surfactant is too little, there is a case that an improvement effect of appearance becomes insufficient, and on the contrary, when it is too much, there is a case that adhesion properties of the antistatic layer with the cured coating film layer becomes bad. The details of the surfactant will be described below.

Various fillers for giving slip properties, and pigments and coloring matters for adjusting color tone may be incorporated into the antistatic layer. Dispersing agents, pH adjustors, and preservatives may be further incorporated.

The thickness of the antistatic layer is not particularly limited as long as desired antistatic properties are achieved, however, it is preferably from 0.001 to 10 μm. When the thickness of the antistatic layer is 0.001 μm or more, antistatic properties become sufficient. In addition, when the thickness of the antistatic layer is 10 μm or less, transparency becomes excellent. The thickness is more preferably from 0.005 to 5 μm.

The antistatic layer is laminated on at least one surface of the resin shaped article. In particular, if the thickness of the resin laminate becomes less than 2 mm, antistatic properties tend to be easily realized even on the surface on which the antistatic layer is not provided. However, the antistatic layer may be laminated on both surfaces of the resin shaped article. In this case, the cured coating film layer may be provided only on one antistatic layer, or on both antistatic layers.

In addition, an optional other functional layer such as antireflective layer may be provided on the surface of the cured coating film layer in this resin laminate, if necessary. For example, when the antireflective layer is formed, a method of coating a commercial antireflective paint to the resin shaped article followed by drying (a wet method), or a physical vapor phase deposition method such as evaporation method or sputtering method can be mentioned. In addition, the surface of the cured coating film layer may be either flat or mat. In addition, an antifouling film may be further laminated. An intermediate layer may be formed between the antistatic layer and the resin shaped article. The details of the intermediate layer will be described below.

As the method for production of the resin laminate in the present invention, for example, a method of consecutively forming the antistatic layer and the cured coating film layer directly on the resin shaped article, a method of transferring a film on which the antistatic layer and the cured coating film layer have been previously formed to the resin shaped article with the help of an adhesive layer, and a method of previously forming the cured coating film layer and the antistatic layer on a mold followed by carrying out cast polymerization and detaching a thus formed resin laminate from the mold after the polymerization has been completed can be mentioned. In particular, a method of forming the cured coating film layer and the antistatic layer on a mold using a transfer film followed by carrying out cast polymerization and detaching a thus formed resin laminate from the mold after the polymerization has been completed, which will be described below, is preferable. Here, this method is explained in detail.

The transfer film has a constitution such that the antistatic layer which is peelable is laminated on a transparent base film, and the antistatic layer contains a π-electron conjugated conductive polymer and at least one resin selected from a polyester resin, a polyurethane resin, a polyesterurethane resin, an acrylic resin, and a melamine resin. More preferably, the transfer film has a mold release layer between the transparent base film and the antistatic layer so as to facilitate transferring. Furthermore preferably, the transfer film has a constitution such that the mold release layer, an intermediate layer, and the antistatic layer are laminated in this order on the transparent base film.

In the method for production of the resin laminate of the preset invention, the first step is to apply the transfer film having the antistatic layer on at least one surface of the transparent base film to a mold by causing a coating layer made of a paint containing a curable resin to lie between the transfer film and the mold, with the antistatic layer of the transfer film being at a side of the mold. As the curable resin, an ultraviolet curable resin is preferable. As the method for applying the transfer film to the mold in the first step, for example, a method of coating a paint containing a curable resin on the mold or on the transfer film and attaching them together by pressure using a rubber roll can be mentioned. In particular, to prevent air entrainment at the time of applying, a method of coating an excess amount of the paint containing the curable resin on the mold and applying the film to the mold while letting the excess paint out by stroking with the rubber roll through the film is preferable.

Further, in the above-mentioned first step, when applying the transfer film having the antistatic layer on at least one surface of the transparent base film to a mold by causing a coating layer made of a paint containing a curable resin to lie between the transfer film and the mold, with the antistatic layer of the transfer film being at the side of the mold, it is preferable to adjust the temperature of the paint containing the curable resin in the range of from 30 to 100° C.

When the temperature of the paint is in the range of from 30 to 100° C., adhesion properties between the cured coating film layer obtained by curing the curable resin and the antistatic layer become excellent and there is no problem concerning coloring of the layers. As a method for heating the paint containing the curable resin, directly heating the paint containing the curable resin, indirectly heating the paint containing the curable resin by heating the mold, or a combination of both may be used.

After applying the transfer film to the mold in the first step, the second step is to form the cured coating film layer by curing the curable resin in the coating layer. When the ultraviolet curable resin is used as the curable resin, ultraviolet light may be irradiated on the ultraviolet curable resin through the transfer film. An ultraviolet lamp may be used for this ultraviolet irradiation. As the ultraviolet lamp, for example, a high-pressure mercury-vapor lamp, metal halide lamp, and fluorescent ultraviolet lamp can be mentioned. Curing by ultraviolet irradiation may be carried out in one stage through the transfer film, or in two stages such as carrying out the first stage curing through the transfer film (the second step), peeling off the transparent base film (the third step), and then further irradiating ultraviolet light to carry out the second stage curing. When a curable resin other than the ultraviolet curable resin is used, curing by irradiation of an energy line such as electron beam or radioactive ray through the transfer film, or by heating may be used.

In the present invention, after the curing of the second step, the transparent base film of the transfer film is peeled off leaving behind the antistatic layer laminated on the cured coating film layer provided on the mold as the third step. In other words, the antistatic layer of the transfer film is transferred on the cured coating film layer on the mold. In addition, the cured coating film layer and the antistatic layer laminated on the cured coating film layer are collectively referred to as "a laminated functional layer".

As the fourth step, a template is made using the mold having the cured coating film layer formed by curing the curable resin and the antistatic layer laminated on the cured coating film layer (the laminated functional layer).

As a member constituting the mold, for example, a stainless steel plate or glass plate having a mirror surface, or a stainless steel plate or glass plate having unevenness on the surface can be used. Manufacturing of the template can be carried out, for example, in such a step that a hollow body composed of soft polyvinyl chloride, ethylene-vinyl acetate copolymer, polyethylene, ethylene-methyl methacrylate copolymer, or the like is inserted as a gasket between two sheets of molds, and the two sheets are fixed with a clamp and constructed into a template constituted of the molds. In addition, as a method for carrying out casting polymerization (cast polymerization) continuously, a method is known in which a resin plate is produced, using two sheets of stainless steel endless belts facing each other while traveling as a mold, as shown in FIG. 1, by carrying out casting polymerization of a raw material for a resin between the endless belts, this method is the most preferable method in point of productivity. In this case, a resin laminate having a cured coating film layer can be produced in high productivity by, for example, previously forming the cured coating film layer on the surface of the stainless steel endless belt.

In a device of FIG. 1, a pair of endless belts 1 and 2 arranged up and down travel at the same speed while tension is given with main pulley 3, 4, 5, and 6, respectively. Carrier rolls 7 arranged in top and bottom pairs support the traveling endless belts 1 and 2 horizontally, and put line loads to the belt surfaces orthogonally to the traveling direction of the belts and vertically to the belt surfaces.

The raw material for the resin is supplied between the endless belts land 2 from polymerizable raw materials injecting device 14. Both side edges of the endless belts 1 and 2 are sealed with two resilient gaskets 12, and a space portion of the template is formed by them. Along with the traveling of the endless belts 1 and 2, the polymerizable raw material supplied between the endless belts 1 and 2 starts polymerization by heating with hot water sprays 9 in the first polymerization zone 8, then polymerization by heating with a far infrared heater in the second polymerization zone 10 is completed, and a resulting molded article is cooled in cooling zone 11, and the molded article is taken out in the direction of arrow 13.

The polymerization temperature in the first polymerization zone is preferably 30 to 90° C., and the polymerization time is preferably about 10 to 40 minutes. However, they are not limited to these ranges of temperature and time. For example, it is possible to use a method such that polymerization is started at a low temperature in the beginning, and then the temperature is raised to continue polymerization. Subsequently, it is also preferable to complete polymerization by heating at a hot temperature condition of about 100 to 130° C. for 10 to 30 minutes in the second polymerization zone.

Further, casting polymerization is carried out by pouring the raw material for the resin into the template as the fifth step.

When casting polymerization of the raw material for the resin to be formed into the resin shaped article is carried out in the template thus made, various conventionally known raw materials can be used for the raw material for the resin. For example, when an acrylic resin-shaped article is produced by casting polymerization, a monomer of a (meth)acrylate ester alone, a monomer essentially composed of a (meth)acrylate ester or a syrup containing a mixture of this monomer and a polymer obtained from this monomer can be mentioned as the raw material for the resin.

In addition, as the acrylic resin constituting such an acrylic resin shaped article, a homopolymer of a (meth)acrylate ester or a copolymer obtained from a (meth)acrylate ester as an essential monomer component can be illustrated. As the (meth)acrylate ester, methyl methacrylate can be illustrated. For example, when copolymerization is carried out using methyl methacrylate as an essential monomer component, acrylates such as methyl acrylate, ethyl acrylate, propyl acrylate, butyl acrylate, and 2-ethythexyl acrylate; methacrylates other than methyl methacrylate such as cyclohexyl methacrylate, phenyl methacrylate, and benzyl methacrylate; and aromatic vinyl compounds such as styrene, α-methyl styrene, and p-methyl styrene can be mentioned as another monomer component.

When a partial polymer of methyl methacrylate monomer or a monomer mixture composed essentially of methyl methacrylate is contained in the methyl methacrylate monomer or the monomer mixture composed essentially of methyl methacrylate, the partial polymer may be dissolved in the methyl methacrylate monomer or in the monomer mixture composed essentially of methyl methacrylate, or the methyl methacrylate monomer or the monomer mixture composed essentially of methyl methacrylate may be partially polymerized. As an initiator to polymerize raw materials for the acrylic resin, a generally used azo initiator or a peroxide initiator can be mentioned, and casting polymerization is carried out by a publicly known method using such an initiator. A mold release agent, ultraviolet absorbent, dye, pigment, and the like can be added to the raw materials for the acrylic resin depending on the purpose.

After the polymerization has been completed, the resin laminate in which the resin shaped article, the antistatic layer, and the cured coating film layer have been sequentially laminated is peeled off the template as the sixth step. The resin laminate thus obtained has an excellent surface free of defects such as those caused by foreign substances because the surface is formed by transferring a mold surface, and is excellent in scratch resistance and antistatic properties.

Hereinafter, the transfer film will be explained in detail.

The transfer film has functions to prevent curing obstruction with oxygen when the coating layer containing the curable resin is cured, and to transfer the antistatic layer to the cured coating film layer side after the curing.

In the present invention, the transparent base film is not particularly limited, however, it is preferable that the transparent base film have a high transmittance in the ultraviolet region when the cured coating film layer is formed by curing an ultraviolet curable resin, because ultraviolet irradiation to the cured coating film layer is applied through the transparent base film.

As such a transparent base film, for example, a plastics film or sheet made of polyester, acrylic resin, cellulose, polyethylene, polypropylene, polyolefin, polyvinyl chloride, polycarbonate, phenolic resin, or urethane resin or a laminate of two or more kinds of them can be mentioned. Among them, the polyester film is preferable in which the balance between heat resistance and flexibility is excellent and polyethylene terephthalate film is more preferable.

The polyester film preferable as the transparent base film is the one which is produced such that an aromatic dicarboxylic acid or its ester as a dicarboxylic acid component such as terephthalic acid, isophthalic acid, or naphthalene dicarboxylic acid, and ethylene glycol, diethylene glycol, 1,4-butanediol, or neopentyl glycol as a glycol component are subjected to an esterification reaction or ester exchange reaction followed by a condensation polymerization reaction to obtain a polyester chip, and the polyester chip thus obtained is dried, then melted by a kneader, and extruded from a T die in a sheet-like form to obtain a unstretched sheet, and the unstretched sheet thus obtained is stretched at least in an uniaxial direction and then subjected to thermal fixing and relaxation treatment.

The above-mentioned film is preferably a biaxially stretched film from the viewpoint of mechanical strength. As a method for stretching, a tubular stretching method, simultaneous biaxial stretching method, and successive biaxial stretching method can be mentioned, and the successive biaxial stretching method is preferable from the viewpoint of flatness, dimensional stability, and unevenness in thickness. The successively biaxially stretched film can be produced, for example, such that a polyester film is stretched 2.0 to 5.0 times in a longitudinal direction with roll drawing at a temperature in the range of from a glass transition temperature (Tg) of polyester to Tg+30° C. and then preliminarily heated and stretched 1.2 to 5.0 times in a traverse direction at a temperature in the range of from 120 to 150° C. with a tenter. This film is further biaxially stretched and then subjected to thermal fixing at a temperature in the range of from 220° C. to (melting point of polyester—10° C.) followed by relaxation in an amount of 3 to 8% in the traverse direction. Further, relaxation in the longitudinal direction may be jointly applied to improve dimensional stability of film in the longitudinal direction and thermal wrinkles to be generated at the time of forming the antistatic layer.

It is preferable to form projections on the surface of the transparent base film by containing particles in order to give handling properties, for example, such as take-up properties in a roll shape after lamination). As the particles to be contained in the film, inorganic particles such as silica, kaolinite, talc, calcium carbonate, zeolite, and alumina; and organic polymer particles having a high heat resistance such as acrylic polymer, nylon, polystyrene, polyester, and benzoguanamine-formalin condensate can be mentioned. From the viewpoint of transparency, it is preferable that the content of the particles in the transparent base film be small, for example, the content be from 1 to 1,000 ppm. Further, in point of transparency, it is preferable to select the particles having a refractive index close to that of the resin to be used. Further, coloring matters and antistatic agents may be contained in the transparent base film, if necessary, in order to give various functions.

The transparent base film to be used in the present invention may be a single layer film or a composite film having two or more layers in which a surface layer and a core layer are laminated. In the case of the composite film, there is an advantage such that each function of the surface layer and the core layer can be independently designed. For example, it is possible to maintain handling properties by containing the particles only in the surface layer having a small thickness to form a convexo-concave surface while further improving transparency of the composite film as a whole by substantially not containing the particles in the core layer having a large thickness. In addition, it is possible to form a surface having little convexo-concave structure while maintaining handling properties in the following step by taking up in a roll shape through forming a two layers structure in which one layer substantially does not contain the particles.

As the method for producing the above-mentioned composite film, taking into account the productivity, lamination with co-extrusion method is particularly preferable in which each raw material of the surface layer and the core layer is extruded from an individual extruder, and these extrudates are guided to one die to obtain an unstretched sheet, and the unstretched sheet thus obtained is oriented at least in one direction.

The thickness of the transparent base film varies depending on materials to be used therefor. In the case of using a polyester film, it is preferably 5 μm or more and more preferably 10 μm or more, and preferably 100 μm or less and more preferably 50 μm or less. When the transparent base film is thin, there is a case where handling properties become insufficient and furthermore there is a case where there occurs fluctuation of quality in the transverse direction at the time of laminating the antistatic layer because of non-uniform coating quantity of the antistatic layer caused by wrinkles of the transparent base film. For example, in the use of small displays of mobile phones, when fluctuation of antistatic properties in the transverse direction of the transfer film becomes large, rejected articles are liable to occur. On the other hand, when the transparent base film is thick, there are not only a case where there are problems of cost, environment and resources but also a case where a curing level of the cured coating film layer become insufficient owing to low transmittance in the ultraviolet region.

In the present invention, the transfer film has at least the antistatic layer on the transparent base film. Surface resistance as measured at a side of the antistatic layer preferably falls in the range of from $1\times10^5$ to $1\times10^{12}\Omega/\square$, more preferably falls in the range of from $1\times10^5$ to $1\times10^{11}\Omega/\square$, and particularly preferably falls in the range of from $1\times10^5$ to $1\times10^{10}\Omega/\square$. When the surface resistance is $1\times10^{12}\Omega/\square$ or less, antistatic properties of the resin laminate can be sufficiently realized regardless of the thickness of the antistatic layer. On the other hand, when the surface resistance is $1\times10^5\Omega/\square$ or more, not only production cost but also deterioration in transparency or coloring of the resin laminate can be suppressed.

The thickness of the antistatic layer is not particularly limited as long as antistatic properties of the resin laminate is sufficiently realized, however, it is preferably from 0.001 to 10 μm. When the thickness of the antistatic layer is 0.001 μm or more, the antistatic properties become sufficient. When the thickness of the antistatic layer is 10 μm or less, transparency of the resin laminate becomes excellent. The thickness of the antistatic layer is more preferably from 0.005 to 5 μm.

As the method for adjusting the surface resistance value to fall in the above-mentioned range, optimization of a kind of conductive polymer, a kind of compounding resin, thickness of coating, addition of a high boiling point solvent, and a drying method can be mentioned.

It is necessary for the antistatic layer to contain a π-electron conjugated conductive polymer. It is possible to reduce humidity dependence of the antistatic properties of the resin laminate and to sufficiently realize antistatic properties of the resin laminate even when the antistatic layer exists inside the resin laminate, by using the π-electron conjugated conductive polymer. The compounding quantity of the π-electron conjugated conductive polymer in a coating liquid for forming the antistatic layer is preferably 10 to 90% by mass based on the content in the antistatic layer thus formed and more preferably 10 to 70% by mass from the viewpoint of sufficiently realizing antistatic properties of the resin laminate.

It is preferable to incorporate the aforementioned other resin component into the antistatic layer besides the π-electron conjugated conductive polymer for improvement of adhesion properties of the antistatic layer with the cured coating film layer and for improvement of coating strength of the antistatic layer. The compounding quantity of the other resin component in the coating liquid for forming the antistatic layer is preferably 10 to 90% by mass based on the content in the antistatic layer thus formed and more preferably 30 to 90% by mass from the viewpoint of sufficiently realizing antistatic properties.

The antistatic layer is formed by coating the coating liquid containing the π-electron conjugated conductive polymer on the transparent base film followed by drying. It is preferable to contain a surfactant in the coating liquid in order to improve leveling property of the coating liquid at the time of coating and at the drying step and further to improve adhesion properties between the antistatic layer and the cured coating film layer after the drying.

As the surfactant, conventional cation, anion, or nonion surfactants can be properly used, however, nonion surfactants having no polar group are preferable from the problem of curing obstruction of the cured coating film layer, and further, silicone, fluorine, or acetylene alcohol surfactants excellent in surface-active properties are preferable.

The content of the surfactant is preferably 0.001 to 1.00% by mass in the coating liquid for forming the antistatic layer. When the content of the surfactant is small, there is a case where an improving effect on appearance after coating is poor. Further, when the content is large, there is a case where adhesion properties of the antistatic layer with the cured coating film layer are poor. From the same reason, the compounding quantity of the surfactant to be contained in the antistatic layer is preferably 0.1 to 10% by mass in terms of the content in the antistatic layer thus formed.

It is preferable that HLB of the surfactant be 2 to 12. The HLB of the surfactant is more preferably 3 or more and particularly preferably 4 or more, and more preferably 11 or less and particularly preferably 10 or less. When the HLB is low, the surface of the antistatic layer becomes water-repellent and adhesion properties of the antistatic layer with the cured coating film layer are liable to be poor. When the HLB is high, the surface of the antistatic layer becomes hydrophilic and an amount of adsorbed water on the surface becomes large and hence curing obstruction is liable to occur, though adhesion properties of the antistatic layer with the cured coating film layer is improved.

Here, HLB is an index value named by W. C. Griffin of Atlas Powder Company in the U.S.A. as Hydrophil Lyophile Balance which characterizes a balance between hydrophilic groups and lipophilic groups which are contained in a molecule of a surfactant, and lipophilicity becomes higher as this value becomes lower while hydrophilicity becomes higher as this value becomes higher.

A photoinitiator may be added to the coating liquid for forming the antistatic layer in order to accelerate curing of the curable resin and to improve adhesion properties between the cured coating film layer and the antistatic layer at an interface thereof. As the photoinitiator, those materials described in the cured coating film layer mentioned above are suitable.

Surprisingly enough, an unexpected effect can be obtained in which a range of a coating condition at the time of forming the antistatic layer can be extended by adding the photoinitiator to the coating liquid for forming the antistatic layer. For example, even if a coating quantity of the coating liquid is increased, adhesion properties at the interface between the antistatic layer and the cured coating film layer can be maintained at an excellent level. In addition, even if temperature of a paint containing the curable resin is not heated to the temperature range of from 30 to 100° C., excellent adhesion properties can be obtained at a lower temperature while maintaining antistatic properties.

At first, as the reason why the above-mentioned unexpected effect was obtained, a mechanism was thought that the photoinitiator moved to the surface of the antistatic layer at the time of drying of the coating film, and this photoinitiator localized to the surface of the antistatic layer accelerated curing of the curable resin in the cured coating film layer when the cured coating film layer is formed and hence improved adhesion properties between the cured coating film layer and the antistatic layer. However, when the photoinitiator in the antistatic layer was quantitatively determined after the antistatic layer was formed on at least one surface of the resin shaped article, an unexpected result was obtained such that the residual quantity of the photoinitiator in the antistatic layer was remarkably small as compared with that at the time of charging. This mechanism is not clear, but this result suggests that the photoinitiator chemically reacted with a resin constituting the antistatic layer at least in the vicinity of the surface of the antistatic layer or the surface of the antistatic layer is physically changed when the photoinitiator volatilizes.

Various fillers for giving sliding properties, and pigments and coloring matters for adjusting color tone may be incorporated into the antistatic layer. Dispersing agents, pH adjustors, and preservatives may be further incorporated.

As a method for forming the antistatic layer on the transparent base film, it is preferable to apply a coating liquid containing the above-mentioned components to the transparent base film directly or through another layer and then dry to form the antistatic layer.

It is preferable to incorporate a high boiling point solvent into the coating liquid for forming the antistatic layer. By adding the high boiling point solvent, the π-electron conjugated conductive polymer dissolves in the drying step and becomes easy to form a continuous layer, so that antistatic properties become excellent.

As the high boiling point solvent, for example, ethylene glycol, diethylene glycol, propylene glycol, triethylene glycol, polyethylene glycol, ethylene glycol monobutyl ether, diethylene glycol monomethyl ether, diethylene glycol monoethyl ether, diethylene glycol monobutyl ether, diethylene glycol monomethyl acetate, diethylene glycol monoethyl acetate, triethylene glycol monomethyl ether, triethylene glycol monoethyl ether, triethylene glycol monobutyl ether, 2-methyl-1,3-propanediol, and N-methyl-2-pyrrolidone can be mentioned. These solvents can be used alone or in a combination of two or more kinds. The content of the high boiling point solvent is preferably in the range of 10 to 200% by mass with respect to the π-electron conjugated conductive polymer.

It is necessary for the coating liquid to be diluted by a solvent from the viewpoint of coating properties.

As the solvent, for example, (1) alcohols such as methyl alcohol, ethyl alcohol, n-propyl alcohol, isopropyl alcohol, n-butyl alcohol, tridecyl alcohol, cyclo-hexyl alcohol, and 2-methylcyclohexyl alcohol; (2) glycols such as ethylene glycol, diethylene glycol, triethylene glycol, polyethylene glycol, propylene glycol, dipropylene glycol, and glycerin; (3)

glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol butyl ether, ethylene glycol monomethyl ether acetate, ethylene glycol monoethyl acetate, ethylene glycol monobutyl acetate, diethylene glycol monomethyl acetate, diethylene glycol monoethyl acetate, and diethylene glycol monobutyl acetate; (4) esters such as ethyl acetate, isopropyl acetate, and n-butyl acetate; (5) ketones such as acetone, methyl ethyl ketone, methyl isobutyl ketone, cyclohexanone, cyclopentanone, isophorone, and diacetone alcohol; and water can be mentioned. These solvents can be used alone or in a combination of two or more kinds. When the aforementioned high boiling point solvent is mixed separately, drying efficiency can be improved by using a low boiling point solvent for dilution.

Further, it is preferable to use a mixed solvent of water and an alcohol from the viewpoint of stability of the coating liquid containing the π-electron conjugated conductive polymer. The dilution rate of the coating liquid is preferably adjusted to give 3 to 20 mPa·s based on viscosity of the coating liquid from the viewpoint of appearance after coating.

When there exist contaminations or undissolved materials such as agglomerates having a size of 1 μm or more of resins in the coating liquid, appearance after coating is liable to be poor. Especially when the coating liquid containing contaminations or undissolved materials, each having a size of 1 μm or more, is coated, there is a case where dents generate on the periphery thereof to form defects having a size of 100 to 1,000 μm. It is preferable to remove these contaminations or undissolved materials by a filter before the coating liquid is applied so as to prevent this poor appearance. As the filter, various items can be suitably used, however, it is preferable to use the one which can remove not less than 99% of these contaminations or undissolved materials having a size of 1 μm or more.

As a method for applying the antistatic layer onto the transparent base film, a publicly known method can be adopted such as a gravure coating method, kiss coating method, dipping method, spray coating method, curtain coating method, air-knife coating method, blade coating method, reverse roll coating method, bar coater method, or lip coating method. Among them, the gravure coating method with which coating can be carried out uniformly, in particular, a reverse gravure method is preferable. Further, it is preferable that a diameter of the gravure be 80 mm or less. When the diameter is large, frequency of occurrence of furrow lines in the flow direction increases. As a doctor blade to be used in the case of the gravure coating method, a publicly known one can be used, however, it is preferable to use the one made of stainless steel, the one coated with ceramics, or the one coated with nickel because the coating liquid containing the π-electron conjugated conductive polymer is liable to corrode metals and hence fluctuation of the coating quantity in the flow direction or transverse direction is liable to become large.

As a method for drying the coating liquid for forming the antistatic layer thus applied onto the transparent base film, a publicly known hot-air or infrared heater drying can be mentioned, and the hot-air drying having a fast drying rate is preferable.

In the initial stage of constant-rate period of drying after coating, it is preferable to dry using a hot air having a temperature of from 10 to 100° C. and a flow velocity of from 2 to 30 m/second. When the initial period of drying is carried out strongly, i.e., using a hot air having a high temperature and large flow velocity, localization of the surfactant to the surface of the antistatic layer is hard to occur, and hence minute defects in the antistatic layer such as minute missing of coating caused by foams generating at the time of preparing or applying the coating liquid, minute repelling of the coating liquid, and cracks are liable to occur besides poor appearance. In addition, there is a case where solubility of the conductive polymer in the high boiling point solvent becomes poor and thus antistatic properties are deteriorated. To the contrary, when the initial period of drying is carried out weekly, i.e., using a hot air having a low temperature and small flow velocity, there is a problem of cost because of a long drying time and further there is a case where a problem such as blushing may occur, though appearance is improved.

In the falling-rate period of drying, it is necessary to make the drying temperature higher than that in the initial period of drying and hence to decrease the quantity of the solvent in the antistatic layer. The temperature is preferably 100 to 160° C. and particularly preferably 110 to 150° C. When the temperature is low, the solvent in the antistatic layer becomes hard to decrease, and there is a case where the solvent becomes a residual solvent and hence temporal stability of the resin laminate becomes poor. To the contrary, when the temperature is high, flatness of the transfer film becomes poor attributed to thermal wrinkles, and there is a case where transfer properties in the succeeding steps become poor. Besides, there is a case where deterioration of the conductive polymer by heat occurs and thus antistatic properties become poor. A time for giving hot air is preferably in the range of from 5 to 180 seconds. When the time is short, the quantity of the solvent remaining in the antistatic layer increases, and hence there is a case where temporal stability becomes poor. To the contrary, when the time is long, there is a case where productivity becomes poor and further there is a case where thermal wrinkles generate in the base film and thus flatness becomes poor. It is particularly preferable that the upper limit of transit time in the hot air be 30 seconds from the viewpoint of productivity and flatness.

In the final period of drying, it is preferable to make the hot-air temperature not more than a glass transition temperature of a resin to be mixed with the π-electron conjugated conductive polymer and to make an actual temperature of the base film in its flat state not more than the glass transition temperature of the resin. If a thus obtained item goes out of a drying furnace at a higher temperature, slip properties become poor when the applied surface touches the surface of a roll and defects generate, and besides, there is a case where a problem such as peel-off of the transfer layer may occur.

In the present invention, it is preferable to form a mold release layer between the transparent base film and the antistatic layer. It is possible to adjust the transfer properties to stably transfer the antistatic layer on the cured coating film layer side by providing the mold release layer.

As the mold release layer, conventional technologies can be used, and for example, paraffin removers, silicone resin removers, cellulose derivative removers, melamine resin removers, polyolefin resin removers, fluorine resin removers, urea resin removers and mixtures thereof can be used.

The thickness of the mold release layer is preferably in the range of from 0.005 to 1 μm from the viewpoint of the transfer properties.

As physical properties of the surface of the mold release layer, it is preferable to adjust materials of the mold release layer such that the contact angle of water becomes 20 to 100 degrees. When the contact angle of water is high, recoatability becomes poor, and there is a case where appearance after coating of the antistatic layer becomes poor. To the contrary, when the contact angle of water is low, there is a case where stable transfer becomes difficult. A method for adjusting the contact angle of water in the above-mentioned range can be attained by adjusting a kind or coating thickness of the mold release agent.

As for a peel force of the antistatic layer from the transparent base film, heavier peel strength is more preferable, judging from problems such as peel-off at the time of handling in the step of producing the transfer film and in the subsequent steps, however, it has to be adjusted in a moderate range because it has to be lighter than the peel force of the curable resin from the mold. The peel force is a value measured such that a tape is applied onto a surface of the antistatic layer and peeled off at a peel rate of 300 mm/min using an universal tensile testing machine, and is preferably in the range of from 5 mN/50 mm to 200 mN/50 mm from the viewpoint of compatibility between transfer properties and handling properties.

In the present invention, it is preferable to provide an intermediate layer between the transparent base film and the antistatic layer. The intermediate layer is a layer to be transferred, together with the antistatic layer, from the transparent base film to the cured coating film layer side, and it has actions of improving strength of the coating film of the antistatic layer and stabilizing transfer properties.

It is preferable to improve adhesion properties of the intermediate layer with the resin shaped article or with the antistatic layer because the intermediate layer moves from the transfer film and finally remains between the resin shaped article constituting the resin laminate and the antistatic layer. For that purpose, it is preferably the same resin as or a similar resin to the resin shaped article. Specifically, when the resin shaped article is made from an acrylic resin, it is preferable to provide 50% by mass or more of the acrylic resin as a resin constituting the intermediate layer.

The thickness of the intermediate layer is preferably 0.1 to 10 μm. When the thickness is too thin, there is a tendency of decrease in effect of improving strength of the coating film of the antistatic layer and stabilizing transfer properties. To the contrary, when it is too thick, there is a case where Moire pattern occurs attributed to light scattering inside the resin laminate.

In the present invention, the transfer film is made by coating the antistatic layer on the transparent base film followed by drying, and is preferably wound up into a roll from the viewpoint of productivity in the subsequent steps. As a roll body after winding, it is preferably 500 to 2,000 mm in width and 10 to 10,000 m in length in the flow direction, i.e., a wound up length. When the width is too narrow, there is a case where productivity deteriorates. To the contrary, when the width is too wide, uniformity of the transfer film in the width direction is liable to be poor, and besides, there is a case where a problem of handling occurs. When the wound up length is too short, there is a case where a fall of production efficiency caused by changing a roll that has finished winding or deterioration of appearance attributed to tape imprints at a winding core may occur. To the contrary, when the wound up length is too long, there is a case where a problem of handling or problems such as peel-off or offset of the antistatic layer attributed to thermal expansion and contraction of a film caused by environmental variation at the time of storage or to pressure by dead load may occur.

EXAMPLES

Hereinafter, the present invention will be explained by the following examples in detail, but the present invention is not limited to these examples. Here, abbreviated designations of compounds used in production examples, examples, and comparative examples are as follows.

"MMA": Methyl methacrylate:

"BA": Butyl acrylate:

"MA": Methyl acrylate:

"AIBN": 2,2'-azobis (isobutyronitrile)

"C6DA": 1,6-hexanediol diacrylate (manufactured by Osaka Organic Chemical Industry Ltd.)

"TAS": A condensate mixture of succinic acid/trimethylolmethane/acrylic acid at a molar ratio of 1:2:4 (manufactured by Osaka Organic Chemical Industry Ltd.)

"U6HA": Urethane (meth)acrylate NK OLIGO-U6HA (trade name, manufactured by Shin-Nakamura Chemical Co., Ltd.)

"M305": Pentaerythritol triacrylate M-305 (trade name, manufactured by Toagosei Co., Ltd.)

"TMPTA": Trimethylolpropane triacrylate (manufactured by Osaka Organic Chemical Industry Ltd.)

"HEA": 2-hydroxyethyl acrylate (manufactured by Osaka Organic Chemical Industry Ltd.)

"BEE": Benzoin ethyl ether (manufactured by Seiko Chemical Co., Ltd.)

In addition, the evaluation of physical properties in the examples was based on the following method.

<Surface Resistance Value of Resin Laminate>

Surface resistance was measured, using an ultra high resistance meter (trade name: ULTRA MEGOHMMETER MODEL SM-10E, manufactured by TOA Corporation), under conditions of a measuring temperature of 23° C. and relative humidity of 50%, such that the surface resistance (Ω/□) on a laminated functional layer side of the resin laminate was measured at one minute after a voltage of 500 V was applied on the surface of the laminated functional layer. As a sample for the measurement, the one which had previously been controlled as to moisture at 23° C. and under relative humidity of 50% for one day was used.

<Surface Resistance Value of a Transfer Film>

Surface resistance on the antistatic layer side was measured, using a surface resistance meter (trade name: MCP-HTP450, manufactured by Mitsubishi Chemical Corporation), under conditions of 23° C., 50% RH, and an applied voltage of 500 V. As a sample for the measurement, the one which had previously been controlled as to moisture at 23° C. and under relative humidity of 50% for one day was used.

<Peel Force>

Peel force was measured such that a polyester tape (trade name: 31B, manufactured by Nitto Denko Corporation) was applied to the antistatic layer side of the transfer film and pressed with a pressure-bonding rubber roller at 0.5 MPa by one time of reciprocating movement, and then T peel test was carried out at a tensile rate of 300 mm/minute, using Autograph manufactured by Shimadzu Corporation to measure the peel force (mN/50 mm).

<Ash Sticking Property Test>

The test was carried out such that a laminated functional layer side of the resin laminate was rubbed 10 times with a dry cloth, and then the laminated functional layer side was allowed to come near to cigarette ash on a plane separated at a constant distance to evaluate sticking properties of the ash.

○: Even if the laminated functional layer side is brought near to the plane at a distance of 10 mm, the ash does not stick.

Δ: When the laminated functional layer side is brought near to the plane at a distance of from 50 to 10 mm, the ash sticks in the middle of being brought near to the plane.

x: The ash sticks at a distance of 50 mm.

<Transfer Properties of an Antistatic Layer to a Cured Coating Film Layer Constituted of an Ultraviolet Curable Resin>

The transferring properties were judged from a result of a visual observation on appearance of a surface layer of polyethylene terephthalate (hereinafter referred to as "PET") film after the third step, i.e., the step of peeling off the PET film.

◎: The antistatic layer does not remain on the PET film at all.

○: The antistatic layer almost does not remain on the PET film.

Δ: The antistatic layer remains on the PET film to some extent.

x: The antistatic layer remains on the PET film.

<Total Light Transmittance and Haze>

Total light transmittance and haze were measured in accordance with measuring methods shown in JIS K7136, using a haze meter (trade name: HAZE METER NDH2000, manufactured by Nippon Denshoku Industries Co., Ltd.).

<Edge Light Test>

The test was carried out such that a resin laminate was cut into a specimen having a short edge of 10 cm and a long edge of 20 cm, and a surface of the resin laminate was observed by a visual observation in a darkroom after a fluorescent light was irradiated from one short edge side of the specimen.

○: Nothing is the matter.

x: A bright point or turbidity is recognized.

<Scratch Resistance>

Scratch resistance was evaluated with change (Δ haze) of haze obtained before and after a scratch test. Namely, a circular pad having a diameter of 25.4 mm loaded with steel wool of #000 is put on the surface of the laminated functional layer side of a resin laminate and reciprocated 100 times on a distance of 20 mm under a load of 9.8N to scratch the laminated functional layer side, and the difference between haze values before and after scratching was determined by the following equation (1).

$$[\Delta\text{haze}(\%)]=[\text{haze value}(\%)\text{after scratch}]-[\text{haze value}(\%)\text{before scratch}] \quad (1)$$

<Moire Pattern>

Light from a naked bulb is irradiated on a resin laminate in a darkroom, and viasual inspection was carried out on the existence of Moire pattern.

○: Moire pattern cannot be recognised.

x: Moire pattern can be recognized.

<Evaluation of Adhesion Properties after Humidity Resistant Test>

The evaluation was carried out such that a resin laminate was left under an atmosphere of 65° C. and 95% RH for 7 days and then evaluated with cross-cut adhesion test in accordance with JIS K5600-5-6.

○: There is no peel-off of the cured coating film layer or the antistatic layer from the resin shaped article.

x: There is peel-off of the cured coating film layer or the antistatic layer from the resin shaped article.

<Evaluation of Adhesion Properties after Hot Water Resistant Test>

The evaluation was carried out such that a resin laminate was soaked in warm water of 60° C. for 4 hours and then evaluated with cross-cut adhesion test in accordance with JIS K5600-5-6.

○: There is no peel-off of the cured coating film layer or the antistatic layer from the resin shaped article.

x: There is peel-off of the cured coating film layer or the antistatic layer from the resin shaped article.

Example 1

(Manufacture of a Transfer Film)

A coating liquid A for forming a mold release layer as shown below was coated on a corona treated surface of a transparent polyester film having a thickness of 25 μm (trade name: E5101, manufactured by Toyobo Co., Ltd.) with a gravure coating method such that the thickness of a thus obtained coating layer after drying becomes 0.04 μm, and dried by passing through a hot air having a temperature of 40° C. and a flow velocity of 5 m/second for 5 seconds, through a hot air of 150° C. and 20 m/second for 10 seconds, and through a hot air of 60° C. and 20 m/second for 5 seconds to form a mold release layer. Subsequently, a coating liquid B for forming an intermediate layer as shown below was coated on the mold release layer with a micro-gravure coating method such that the thickness of a thus obtained coating layer after drying becomes 0.5 μm, and dried by passing through a hot air having a temperature of 40° C. and a flow velocity of 5 m/second for 5 seconds, through a hot air of 150° C. and 20 m/second for 10 seconds, and through a hot air of 60° C. and 20 m/second for 5 seconds to form the intermediate layer. Further, a coating liquid C for forming an antistatic layer as shown below was coated on the intermediate layer with a micro-gravure coating method using a ceramic doctor such that the thickness of a thus obtained coating layer after drying becomes 0.02 μm, and dried by passing through a hot air having a temperature of 20° C. and a flow velocity of 5 m/second for 5 seconds, through a hot air of 130° C. and 20 m/second for 10 seconds, and through a hot air of 60° C. and 20 m/second for 5 seconds to form the antistatic layer, and a transfer film was finally manufactured. Surface resistance value of the transfer film thus obtained was $8\times10^{8}\Omega/\square$ and peel force was 22 mN/50 mm.

(Coating Liquid A for Forming a Mold Release Layer)

The following materials were mixed at the following mass ratio and the resultant mixture was stirred for more than 15 minutes under room temperature. Subsequently, impurities were removed by a filter with nominal filtration rating of 1 μm to prepare coating liquid A.

| | |
|---|---|
| Toluene | 50.00% by mass |
| Methyl ethyl ketone | 48.99% by mass |
| Amino alkyd resin | 1.00% by mass (trade name: Tess Fine 322, manufactured by Hitachi Kasiei Polymer Co., Ltd., solid content: 40% by mass) |
| Catalyst | 0.01% by mass (trade name: Drier 900, manufactured by Hitachi Kasei Polymer Co., Ltd., solid content: 50% by mass) |

(Coating Liquid B for Forming an Intermediate Layer)

Toluene, methyl ethyl ketone, and a resin were mixed at the following mass ratio, and the resultant mixture was stirred while heated to dissolve the resin. Subsequently, undissolved matters were removed by a filter with nominal filtration rating of 1 μm after the resultant liquid was cooled to prepare coating liquid B.

| | |
|---|---|
| Toluene | 57.00% by mass |
| Methyl ethyl ketone | 38.00% by mass |
| Acrylic resin | 5.00% by mass (trade name: BR-80, manufactured by Mitsubishi Rayon Co., Ltd.) |

(Coating Liquid C for Forming an Antistatic Layer)

The following materials were mixed at the following mass ratio and agglomerates in the resultant mixture were removed by a filter with nominal filtration rating of 1 μm to prepare coating liquid C.

| | |
|---|---|
| Isopropyl alcohol | 58.00% by mass |
| Water | 10.59% by mass |
| Polyester resin | 1.40% by mass (trade name: Vylonal MD1200, manufactured by Toyobo Co., Ltd., solid content: 30% by mass) |
| Polythiophene | 20.00% by mass (trade name: Baytron P, poly(3,4-ethylenedioxy thiophene), manufactured by H. C. Starck-V TECH, solid content: 1.2% by mass) |
| Surfactant | 0.01% by mass (trade name: Dynol 604, manufactured by Nissin Chemical Industry Co., Ltd.) |

(Manufacture of a Resin Laminate)

On a stainless steel (SUS304) plate which will become a mold, a paint containing an ultraviolet curable resin including 50 parts by mass of TAS, 50 parts by mass of C6DA, and 1.5 parts by mass of BEE was coated.

On the coating film containing the ultraviolet curable resin, formed on the stainless steel plate, which was controlled as to temperature in an air furnace, the transfer film was piled with the antistatic layer side facing to the mold side and attached to the coating film by pressure so as not to entrain air voids while pushing out an excess amount of the paint using a rubber roll having a JIS hardness of 40 degrees so that the thickness of the coating film containing the ultraviolet curable resin could become 15 μm. The temperature of the paint containing the ultraviolet curable resin at the time of the attaching by pressure was 40° C. In addition, the thickness of the coating film containing the ultraviolet curable resin was calculated from a supply quantity and a developed area of the paint containing the ultraviolet curable resin. Subsequently, after 10 seconds passed, the coating film was irradiated by an ultraviolet light through the transfer film by passing through the position 20 cm beneath a fluorescent ultraviolet lamp with 40 W output power (trade name: FL40BL, manufactured by Toshiba Corporation) at a speed of 0.3 m/min, and the ultraviolet curable resin was cured.

When the transfer film was peeled off afterwards, all the antistatic layer was transferred to the cured coating film layer. Subsequently, a laminated body thus obtained was passed through the position 20 cm beneath a high-pressure mercury-vapor lamp with 30 W/cm output power at a speed of 0.3 m/min, with the laminated functional layer side on the stainless steel plate being placed upper side, and the cured coating film layer was further cured to obtain a laminated functional layer having a film thickness of 13 μm. The film thickness of the laminated functional layer was determined by measuring a differential interference microscope image of a section of a product thus obtained.

Two stainless steel plates each having the laminated functional layer formed in this way were provided and arranged with each laminated functional layer being placed inside and facing each other, and periphery of these plates was sealed with gaskets made of plasticized polyvinyl chloride to make a template for casting polymerization. Raw materials for a resin containing 100 parts by mass of a mixture composed of 20 parts by mass of MMA polymer having a weight average molecular weight of 220,000 and 80 parts by mass of MMA monomer, 0.05 part by mass of AIBN, and 0.005 part by mass of sodium dioctyl sulfosuccinate were poured into this template, and a space of the stainless steel plates facing each other was adjusted to 2.5 mm, and polymerization was carried out in a water bath at 80° C. for 1 hour and then in an air furnace at 130° C. for 1 hour. Subsequently, the resultant system was cooled, and an acrylic resin laminate with a plate thickness of 2 mm having laminated functional layers on both sides, namely, cured coating film layers on surface sides and antistatic layers insides was obtained by peeling off a resin plate thus obtained from the stainless steel plates.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either.

In addition, surface resistance value was $4\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

Example 2

The same procedure as in Example 1 was carried out except that a paint containing 30 parts by mass of U6HA, 70 parts by mass of C6DA, and 1.5 parts by mass of BEE as an ultraviolet curable resin was used to make an acrylic resin laminate.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $4\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

Example 3

The same procedure as in Example 1 was carried out except that a paint containing 28 parts by mass of U6HA, 20 parts by mass of M305, 52 parts by mass of C6DA, and 1.5 parts by mass of BEE as an ultraviolet curable resin was used to make an acrylic resin laminate.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $3\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

Example 4

The same procedure as in Example 1 was carried out except that a paint containing 50 parts by mass of TAS, 30 parts by mass of HEA, 20 parts by mass of M305, and 1.5 parts by mass of BEE as an ultraviolet curable resin was used to make an acrylic resin laminate.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $2\times10^{12}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

Example 5

The same procedure as in Example 1 was carried out except that a paint containing 50 parts by mass of TAS, 40 parts by mass of HEA, 10 parts by mass of TMPTA, and 1.5 parts by mass of BEE as an ultraviolet curable resin was used to make an acrylic resin laminate.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $2\times10^{11}\Omega/\square$, and the result of ash sticking properties test showed that the ash did not stick to the surface of the resin laminate. An increment of haze after a scratching test was 0.2%, and it was excellent both in antistatic properties and scratch resistance. In addition, adhesion properties of the cured coating film layer and the antistatic layer were also excellent.

Example 6

At first, the same procedure as in example 1 was carried out to obtain a transfer film. Subsequently, the same procedure as in example 1 was carried out to prepare a paint containing an ultraviolet curable resin. In a device of FIG. 1, on an upper belt of two endless belts facing each other, traveling in the same direction at the same speed (2.5 m/min), having a width of 1,500 mm and a thickness of 1 mm, and being mirror surface finished and made of stainless steel (SUS304), the paint containing the ultraviolet curable resin is applied in the same manner as in Example 1 and the transfer film was attached to the upper belt by pressure using a rubber roll. The belt temperature at the time of the attaching by pressure was 48° C.

Subsequently, curing by ultraviolet light was carried out in the same manner as in Example 1, and the transfer film was peeled off to obtain a laminated functional layer constituted of an antistatic layer and a cured coating film layer on the stainless steel endless belt. All the antistatic layer on the film was transferred to the cured coating film layer. Subsequently, the cured coating film layer was further cured in the same manner as in Example 1. The thickness of the cured coating film layer was 15 μm. A sectional view of a device to carry out these steps is shown in FIG. 2.

Figure 2:
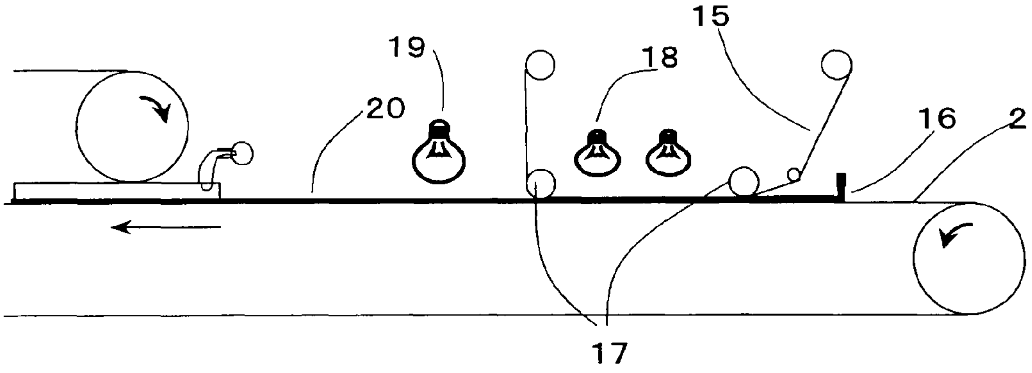
FIG. 2: A schematic sectional view illustrating a shaping device of a laminate usable for the method of the present invention.

In a device of FIG. 2, transfer film 15 having an antistatic layer is attached by pressure on paint 16 which contains an ultraviolet curable resin and has been applied onto endless belt 2, using rubber roll 17. Subsequently, the ultraviolet curable resin is cured by fluorescent ultraviolet lamp 18 and high-pressure mercury-vapor lamp 19 to form laminated functional layer 20 constituted of an antistatic layer and a cured coating film layer.

A template is constructed by causing the endless belt on one surface of which the laminated functional layer has been formed as mentioned above and the other endless belt to face each other, and by providing gaskets, which are made of plasticized polyvinyl chloride and travel at the same speed as both endless belts, at both side edges of the endless belts facing each other. A space between the two endless belts has been previously set to become 1.2 mm. The same raw materials for a resin for forming a resin shaped article as in Example 1 was poured into this template at a constant flow rate, heated in a water shower at 78° C. for 30 minutes with a transfer of the belts to be polymerized and cured, subjected to heat treatment of a far infrared rays heater at 135° C. for 20 minutes, and cooled to 100° C. by ventilation for 10 minutes, and a resin plate thus obtained was peeled off from the endless belts to obtain an acrylic resin laminate stably for the length of 75 m, the acrylic resin laminate having 1.2 mm in thickness and having a laminated functional layer, namely a cured coating film layer and an antistatic layer, on one surface thereof.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $2\times10^{11}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

Example 7

The same procedure as in Example 1 was carried out except that the coating liquid C for forming the antistatic layer was changed to coating liquid D for forming an antistatic layer as shown below to obtain a transfer film. A surface resistance value of the transfer film thus obtained was $7\times10^{10}\Omega/\square$ and peel force was 22 mN/50 mm. Subsequently, an acrylic resin laminate was made in the same manner as in Example 1.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $4\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

(Coating Liquid D for Forming an Antistatic Layer)

The following materials were mixed at the following mass ratio and agglomerates in the resultant mixture were removed by a filter with nominal filtration rating of 1 μm to prepare coating liquid D.

| | |
|---|---|
| Isopropyl alcohol | 68.00% by mass |
| Water | 20.39% by mass |
| Polyester resin | 1.60% by mass (trade name: Vylonal MD1200, manufactured by Toyobo Co., Ltd., solid content: 30% by mass) |
| Polythiophene | 10.00% by mass (trade name: Baytron P, poly(3,4-ethylenedioxy thiophene), manufactured by H. C. Starck-V TECH, solid content: 1.2% by mass) |
| Surfactant | 0.01% by mass (trade name: Dynol 604, manufactured by Nissin Chemical Industry Co., Ltd.) |

Example 8

The same procedure as in Example 1 was carried out except that the coating liquid C for forming the antistatic layer was changed to coating liquid E for forming an antistatic layer as shown below to obtain a transfer film. A surface resistance value of the transfer film thus obtained was $5\times10^{8}\Omega/\square$ and peel force was 22 mN/50 mm. Subsequently, an acrylic resin laminate was made in the same manner as in Example 1.

The acrylic resin laminate thus obtained had a total light transmittance of 91% and a haze of 0.2% and was excellent in transparency. Further, it had excellent appearance without any Moire patterns and defects in appearance attributed to foreign substances. There was no abnormality in the edge light test, either. In addition, a surface resistance value was $1\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

(Coating Liquid E for Forming an Antistatic Layer)

The following materials were mixed at the following mass ratio and agglomerates in the resultant mixture were removed by a filter with nominal filtration rating of 1 μm to prepare coating liquid E.

| | |
|---|---|
| Isopropyl alcohol | 48.80% by mass |
| Water | 20.39% by mass |
| Polyester resin | 0.80% by mass (trade name: Vylonal MD1200, manufactured by Toyobo Co., Ltd., solid content: 30% by mass) |
| Polythiophene | 30.00% by mass (trade name: Baytron P, poly(3,4-ethylenedioxy thiophene), manufactured by H. C. Starck-V TECH, solid content: 1.2% by mass) |
| Surfactant | 0.01% by mass (trade name: Dynol 604, manufactured by Nissin Chemical Industry Co., Ltd.) |

Example 9

The same procedure as in Example 1 was carried out except that the coating liquid C for forming the antistatic layer was changed to coating liquid F for forming an antistatic layer as shown below to obtain a transfer film. A surface resistance value of the transfer film thus obtained was $5\times10^{8}\Omega/\square$ and peel force was 22 mN/50 mm. Subsequently, an acrylic resin laminate was made in the same manner as in Example 1.

The acrylic resin laminate thus obtained had a total light transmittance of 91% and a haze of 0.5% and was excellent in transparency. Further, it had excellent appearance without any Moire patterns and defects in appearance attributed to foreign substances. There was no abnormality in the edge light test, either. In addition, a surface resistance value was $1\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

(Coating Liquid F for Forming an Antistatic Layer)

The following materials were mixed at the following mass ratio and agglomerates in the resultant mixture were removed by a filter with nominal filtration rating of 1 μm to prepare coating liquid F.

| | |
|---|---|
| Isopropyl alcohol | 58.70% by mass |
| Water | 20.39% by mass |
| Acrylic resin | 0.90% by mass (trade name: Acryset 270E, manufactured by Nippon Shokubai Co., Ltd., solid content: 40% by mass) |
| Polythiophene | 20.00% by mass (trade name: Baytron P, poly(3,4-ethylenedioxy thiophene), manufactured by H. C. Starck-V TECH, solid content: 1.2% by mass) |
| Surfactant | 0.01% by mass (trade name: Dynol 604, manufactured by Nissin Chemical Industry Co., Ltd.) |

Example 10

The same procedure as in Example 1 was carried out except that the coating liquid C for forming the antistatic layer was changed to coating liquid G for forming an antistatic layer as shown below to obtain a transfer film. A surface resistance value of the transfer film thus obtained was $8\times10^{8}\Omega/\square$ and peel force was 22 mN/50 mm. Subsequently, an acrylic resin laminate was made in the same manner as in Example 1.

The acrylic resin laminate thus obtained had a total light transmittance of 91% and a haze of 0.5% and was excellent in transparency. Further, it had excellent appearance without any Moire patterns and defects in appearance attributed to foreign substances. There was no abnormality in the edge light test, either. In addition, a surface resistance value was $1\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent.

(Coating Liquid G for Forming an Antistatic Layer)

The following materials were mixed at the following mass ratio and agglomerates in the resultant mixture were removed by a filter with nominal filtration rating of 1 μm to prepare coating liquid G

| | |
|---|---|
| Isopropyl alcohol | 58.57% by mass |
| Water | 20.39% by mass |
| Urethane resin | 1.03% by mass (trade name: W-635, manufactured by Mitsui Takeda Chemicals Inc., solid content: 35% by mass) |
| Polythiophene | 20.00% by mass (trade name: Baytron P, poly(3,4-ethylenedioxy thiophene), manufactured by H. C. Starck-V TECH, solid content: 1.2% by mass) |
| Surfactant | 0.01% by mass (trade name: Dynol 604, manufactured by Nissin Chemical Industry Co., Ltd.) |

Example 11

The same procedure as in Example 1 was carried out except that the mold release layer was not provided to make a transfer film. Surface resistance value of the transfer film thus obtained was $8\times10^{8}\Omega/\square$ and peel force was 218 mN/50 mm. Subsequently, an acrylic resin laminate was made in the same manner as in Example 1.

The acrylic resin laminate thus obtained had a total light transmittance of 91% and a haze of 0.5% and was excellent in transparency. Further, it had excellent appearance without any Moire patterns and defects in appearance attributed to foreign substances, however, there was partial failure of transfer. A surface resistance value of the transferred portion was $1\times10^{13}\Omega/\square$, and the result of ash sticking properties test showed that the ash did not stick to the resin laminate. An increment of haze after a scratching test was 0.0%, and it was excellent both in antistatic properties and scratch resistance. In addition, adhesion properties of the cured coating film layer and the antistatic layer were also excellent.

Example 12

The same procedure as in Example 1 was carried out except that the temperature of the paint containing the ultraviolet curable resin at the time of attaching the transfer film by pressure was 15° C. to form an acrylic resin laminate.

The acrylic resin laminate thus obtained had a total light transmittance of 92% and a haze of 0.2% and was excellent in transparency. Further, it had excellent appearance without any Moire patterns and defects in appearance attributed to foreign substances. There was no abnormality in the edge light test, either. In addition, a surface resistance value was $4\times10^{13}\Omega/\square$, and the result of ash sticking properties test showed that the ash did not stick to the surface of the resin laminate. An increment of haze after a scratching test was 0.0%, and it was excellent in scratch resistance. However, adhesion properties after humidity resistant test and after hot water resistant test were bad, and the cured coating film layer was peeled off, and durability as an acrylic resin laminate was insufficient.

Comparative Example 1

The same procedure as in Example 1 was carried out except that the antistatic layer was not provided to make a transfer film. A surface resistance value of the transfer film thus obtained was not less than $1\times10^{14}\Omega/\square$ and peel force was 22 mN/50 mm. Subsequently, an acrylic resin laminate was made in the same manner as in Example 1.

The acrylic resin laminate thus obtained had a total light transmittance of 92% and a haze of 0.2% and was excellent in transparency. Further, it had excellent appearance without any Moire patterns and defects in appearance attributed to foreign substances. A surface resistance value was not less than $1\times10^{16}\Omega/\square$, and the result of ash sticking properties test showed that the ash sticked to the surface of the resin laminate and the antistatic properties were poor. An increment of haze after a scratching test was 0.0%, and it was excellent in scratch resistance.

Comparative Example 2

The same procedure as in Example 1 was carried out except that the coating liquid C for forming the antistatic layer was changed to coating liquid H for forming an antistatic layer as shown below to obtain a transfer film having a thickness of 0.2 μm. A surface resistance value of the transfer film thus obtained was $3\times10^{8}\Omega/\square$ and peel force was 22 mN/50 mm.

Subsequently, an acrylic resin laminate was made in the same manner as in Example 2, however, uneven transfer in which there existed transferred portion and untransferred portion was observed on all but the first 1 m of the laminate.

The acrylic resin laminate thus obtained had a total light transmittance of 92% and a haze of 0.2% and was excellent in transparency. However, appearance was poor because there were observed unevenness attributed to Moire patterns here and there and white turbidity at a transferred portion of the antistatic layer in the edge light test. A surface resistance value of the transferred portion was $1\times10^{13}\Omega/\square$, and the result of ash sticking properties test showed that the ash did not stick to the surface of the resin laminate. An increment of haze after a scratching test was 0.0%, and it was excellent both in antistatic properties and scratch resistance. On the other hand, peel-off of the cured coating film layer was observed in the hot water resistant test.

(Coating Liquid H for Forming an Antistatic Layer)

The following materials were mixed at the following mass ratio and agglomerates in the resultant mixture were removed by a filter with nominal filtration rating of 1 μm to prepare coating liquid H.

| | |
|---|---|
| Isopropyl alcohol | 82.0% by mass |
| Triethylamine | 1.0% by mass |
| Acrylic resin | 10.0% by mass (trade name: DIANAL BR 80, manufactured by Mitsubishi Rayon Co., Ltd.) |
| Tin oxide fine particles | 7.0% by mass (trade name: FSS-10M, manufactured by Ishihara Sangyo Kaisha, Ltd.) |

Example 13

The same procedure as in Example 1 was carried out except that the coating liquid C for forming the antistatic layer was changed to coating liquid I for forming an antistatic layer as shown below to obtain a transfer film. A surface resistance value of the transfer film thus obtained was $6\times10^{10}\Omega/\square$ and peel force was 22 mN/50 mm. Further, minute convexo-concave pattern was observed on the surface of the transfer film thus obtained and the surface was cloudy.

In the coating liquid I for forming an antistatic layer, charged quantity of the photoinitiator with respect to the solid content was 66% by mass. However, the remaining quantity of the photoinitiator in the antistatic layer after the coating liquid I for forming the antistatic layer was coated on the resin laminate plate and dried was 2% by mass with respect to the solid content. This remaining quantity of the photoinitiator is a value quantitatively determined based on a calibration curve made from the results obtained such that absorbance in an ultraviolet region was measured on samples having different contents of the photoinitiator in the antistatic layer using a spectralphotometer (trade name: UV-3150, manufactured by Shimadzu Corporation).

Subsequently, an acrylic resin laminate was made in the same manner as in Example 1.

The acrylic resin laminate thus obtained had a total light transmittance of 92% and a haze of 0.2%. In addition, transparency was excellent, though the transfer film was cloudy. Further, the acrylic resin laminate thus obtained had excellent appearance without any Moire patterns and defects in appearance attributed to foreign substances, and there was no abnormality in the edge light test, either. And a surface resistance value was $3\times10^{13}\Omega/\square$. The result of ash sticking properties test on the acrylic resin laminate showed that the ash did not stick to the surface of the resin laminate. An increment of haze after a scratching test was 0.0%, and it was excellent both in antistatic properties and scratch resistance. In addition, adhesion properties of the cured coating film layer and the antistatic layer were also excellent. Further, the hot water resistant test was carried out in long time, i.e., soaked in a warm water at 60° C. for 12 hours, and adhesion properties were superior to those in Example 1.

(Coating Liquid I for Forming an Antistatic Layer)

The following materials were mixed at the following mass ratio and agglomerates in the resultant mixture were removed by a filter with nominal filtration rating of 1 μm to prepare coating liquid I.

| | |
|---|---|
| Isopropyl alcohol | 58.00% by mass |
| Water | 9.29% by mass |
| Polyester resin | 1.40% by mass (trade name: Vylonal MD1200, manufactured by Toyobo Co., Ltd., solid content: 30% by mass) |
| Polythiophene | 20.00% by mass (trade name: Baytron P, poly(3,4-ethylenedioxy thiophene), manufactured by H. C. Starck-V TECH, solid content: 1.2% by mass) |
| Surfactant | 0.01% by mass (trade name: Dynol 604, manufactured by Nissin Chemical Industry Co., Ltd.) |
| Photoinitiator | 1.30% by mass (trade name: DARUCUR1173, manufactured by Ciba Specialty Chemicals Inc.) |

Example 14

The same procedure as in Example 13 was carried out except that the temperature of the paint containing the ultraviolet curable resin at the time of attaching the transfer film by pressure was changed from 40° C. to 15° C. to form an acrylic resin laminate.

The acrylic resin laminate thus obtained had a total light transmittance of 92% and a haze of 0.2% and was excellent in transparency. Further, it had excellent appearance without any Moire patterns and defects in appearance attributed to foreign substances. Further, there was no abnormality in the edge light test, either. And a surface resistance value was $3\times10^{13}\Omega/\square$. Further, the result of ash sticking properties test on the acrylic resin laminate showed that the ash did not stick to the surface of the resin laminate. An increment of haze after a scratching test was 0.0%, and it was excellent in scratch resistance. Different from the result in Example 12, adhesion properties after the humidity resistant test and after the hot water resistant test were excellent.

Examples 15 to 17

The same procedures as in Example 1 were carried out except that each space between the stainless steel plates facing each other was changed to obtain acrylic resin laminates, each having a thickness of 0.3 mm, 0.5 mm, and 1.0 mm, respectively. Only in the case of the acrylic resin laminate of 0.3 mm in thickness, crack generated when the resin laminate was peeled off from the stainless steel plates, so that evaluation was carried out on the portion where there is no crack. The results are shown in Table 2.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Total light transmittance (%) | 92 | 92 | 92 | 92 | 92 | 92 | 92 | 91 |
| Haze (%) | 0.2 | 0.2 | 0.2 | 0.2 | 0.2 | 0.2 | 0.2 | 0.2 |
| Moire pattern | ○ | ○ | ○ | ○ | ○ | ○ | ○ | ○ |
| Appearance (Edge light test) | ○ | ○ | ○ | ○ | ○ | ○ | ○ | ○ |
| Antistatic agent | PTP* | PTP* | PTP* | PTP* | PTP* | PTP* | PTP* | PTP* |
| Surface resistance value (Ω/□) | $4 \times 10^{13}$ | $4 \times 10^{13}$ | $3 \times 10^{13}$ | $2 \times 10^{12}$ | $2 \times 10^{11}$ | $1 \times 10^{14}$ | $4 \times 10^{13}$ | $1 \times 10^{13}$ |
| Increment of haze after a scratching test | 0.0 | 0.0 | 0.0 | 0.0 | 0.2 | 0.0 | 0.0 | 0.0 |
| Ash sticking properties | ○ | ○ | ○ | ○ | ○ | ○ | ○ | ○ |
| Adhesion properties after humidity resistant test | ○ | ○ | ○ | ○ | ○ | ○ | ○ | ○ |
| Adhesion properties after hot water resistant test | ○ | ○ | ○ | ○ | ○ | ○ | ○ | ○ |
| Transfer properties | ◎ | ◎ | ◎ | ◎ | ◎ | ◎ | ◎ | ◎ |

| | Ex. 9 | Ex. 10 | Ex. 11 | Ex. 12 | Comp. Ex. 1 | Comp. Ex. 2 | Ex. 13 | Ex. 14 |
|---|---|---|---|---|---|---|---|---|
| Total light transmittance (%) | 91 | 91 | 91 | 92 | 92 | 92 | 92 | 92 |
| Haze (%) | 0.5 | 0.5 | 0.5 | 0.2 | 0.2 | 0.2 | 0.2 | 0.2 |
| Moire pattern | ○ | ○ | ○ | ○ | ○ | X | ○ | ○ |

TABLE 1-continued

| | | | | | | | | |
|---|---|---|---|---|---|---|---|---|
| Appearance (Edge light test) | ○ | ○ | ○ | ○ | ○ | X | ○ | ○ |
| Antistatic agent | PTP* | PTP* | PTP* | PTP* | none | Tin oxide | PTP* | PTP* |
| Surface resistance value (Ω/□) | $1 \times 10^{13}$ | $1 \times 10^{13}$ | $1 \times 10^{13}$ | $4 \times 10^{13}$ | $>1 \times 10^{16}$ | $1 \times 10^{13}$ | $3 \times 10^{13}$ | $3 \times 10^{13}$ |
| Increment of haze after a scratching test | 0.0 | 0.0 | 0.0 | 0.0 | 0.0 | 0.0 | 0.0 | 0.0 |
| Ash sticking properties | ○ | ○ | ○ | ○ | X | ○ | ○ | ○ |
| Adhesion properties after humidity resistant test | ○ | ○ | ○ | X | ○ | ○ | ○ | ○ |
| Adhesion properties after hot water resistant test | ○ | ○ | ○ | X | ○ | X | ○ | ○ |
| Transfer properties | ◎ | ◎ | Δ | ◎ | — | Δ | ◎ | ◎ |

(PTP*: Polythiophene)

TABLE 2

| | Example 15 | Example 16 | Example 17 |
|---|---|---|---|
| Thickness of laminate | 0.3 | 0.5 | 1.0 |
| Total light transmittance (%) | 92 | 92 | 92 |
| Haze (%) | 0.2 | 0.2 | 0.2 |
| Moire pattern | ○ | ○ | ○ |
| Appearance (Edge light test) | ○ | ○ | ○ |
| Antistatic agent | Poly-thiophene | Poly-thiophene | Poly-thiophene |
| Surface resistance value (Ω/□) | $4 \times 10^{13}$ | $4 \times 10^{13}$ | $3 \times 10^{13}$ |
| Increment of haze after a scratching test | 0.0 | 0.0 | 0.0 |
| Ash sticking properties | ○ | ○ | ○ |
| Adhesion properties after humidity resistant test | ○ | ○ | ○ |
| Adhesion properties after hot water resistant test | ○ | ○ | ○ |
| Transfer properties | ◎ | ◎ | ◎ |

INDUSTRIAL APPLICABILITY

According to the present invention, a resin laminate having sufficient antistatic properties and excellent scratch resistance and transparency can be obtained because an antistatic layer containing a conductive polymer is laminated on at least one surface of a resin shaped article, and a cured coating film layer is laminated on the antistatic layer.

Further, according to the present invention, a resin laminate having excellent surface without any defects caused by foreign substances because the surface is formed by transferring a mold surface, and sufficient antistatic properties as well as excellent scratch resistance and transparency can be produced in high productivity.

Such a superior resin laminate can be suitably used in name plates of various electric apparatuses; various glazings such as partition; front plates of various displays such as CRT, liquid crystal display, organic electroluminescence display, plasma display, and projection television; and front plates of information displays in information terminals such as mobile telephone, portable music player, and mobile PC.

What is claimed is:

1. A resin laminate, comprising:

an intermediate layer having a thickness of 0.1 to 10 μm which is on at least one surface of a resin shaped article, an antistatic layer which is on the intermediate layer, and a cured coating film layer on the antistatic layer, wherein the cured coating film layer is obtained by curing a curable resin, and wherein the antistatic layer contains a π-electron conjugated conductive polymer containing thiophene or a derivative of thiophene as a constitutional unit, and at least one resin selected from the group consisting of a polyester resin, a polyurethane resin, a polyesterurethane resin, an acrylic resin, and a melamine resin and a surfactant having hydrophilic lipophilic balance (HLB) of from 2 to 12 at an amount of from 0.1 to 10% by mass, and the intermediate layer is constituted of an acrylic resin.

2. The resin laminate according to claim 1, wherein the curable resin is an ultraviolet curable resin.

3. The resin laminate according to claim 1, wherein the resin shaped article is constituted of an acrylic resin.

4. The resin laminate according to claim 1, wherein the π-electron conjugated conductive polymer is a copolymer comprising at least one thiophene monomer copolymerized with another monomer.

5. The resin laminate according to claim 1, wherein the π-electron conjugated conductive polymer comprises polymerized units of 3,4-ethylenedioxy thiophene.

6. The resin laminate according to claim 1, wherein the at least one resin selected from the group consisting of a polyester resin, a polyurethane resin, a polyesterurethane resin, an acrylic resin, and a melamine resin is present in the antistatic layer in an amount of from 30 to 90% by mass.

7. The resin laminate according to claim 1, wherein the intermediate layer consists of the acrylic resin.

8. A transfer film for use in the production of a resin laminate to be made by laminating an antistatic layer and a cured coating film layer on a resin shaped article, the transfer film comprising:

a transparent base film, a mold release layer, an intermediate layer having a thickness of 0.1 to 10 μm, and an antistatic layer which contains a π-electron conjugated conductive polymer containing thiophene or a derivative of thiophene as a constitutional unit, and at least one resin selected from the group consisting of a polyester resin, a polyurethane resin, a polyesterurethane resin, an acrylic resin, and a melamine resin and a surfactant having a hydrophilic lipophilic balance (HLB) of from 2 to 12 at an amount of from 0.1 to 10% by mass, and wherein the antistatic layer is present on at least one surface of the transparent base film, wherein surface resistance as measured at a side of the antistatic layer is in the range of from $1\times10^5$ to $1\times10^{12}\Omega/\square$, wherein the mold release layer, the intermediate layer, and the antistatic layer are laminated in this order on the transparent base film, and the intermediate layer is constituted of an acrylic resin.

9. The transfer film according to claim 8, wherein the π-electron conjugated conductive polymer is a copolymer comprising at least thiophene monomer copolymerized with another monomer.

10. The transfer film according to claim 8, wherein the π-electron conjugated conductive polymer comprises polymerized units of 3,4-ethylenedioxy thiophene.

11. The transfer film according to claim 8, wherein the at least one resin selected from the group consisting of a polyester resin, a polyurethane resin, a polyesterurethane resin, an acrylic resin, and a melamine resin is present in the antistatic layer in an amount of from 30 to 90% by mass.

* * * * *